(12) United States Patent
Seidel et al.

(10) Patent No.: US 11,559,951 B2
(45) Date of Patent: Jan. 24, 2023

(54) COMPOSITE COMPONENT

(71) Applicant: Covestro Deutschland AG, Leverkusen (DE)

(72) Inventors: Andreas Seidel, Dormagen (DE); Sven Hobeika, Solingen (DE); Ralf Hufen, Duisburg (DE)

(73) Assignee: Covestro Deutschland AG, Leverkusen (DE)

( * ) Notice: Subject to any disclaimer, the term of this patent is extended or adjusted under 35 U.S.C. 154(b) by 713 days.

(21) Appl. No.: 16/474,199

(22) PCT Filed: Dec. 22, 2017

(86) PCT No.: PCT/EP2017/084281
§ 371 (c)(1),
(2) Date: Jun. 27, 2019

(87) PCT Pub. No.: WO2018/122137
PCT Pub. Date: Jul. 5, 2018

(65) Prior Publication Data
US 2019/0352500 A1    Nov. 21, 2019

(30) Foreign Application Priority Data
Dec. 28, 2016  (EP) .................................... 16207039

(51) Int. Cl.
| | | |
|---|---|---|
| B29C 67/24 | (2006.01) | |
| B29C 45/00 | (2006.01) | |
| B29C 45/16 | (2006.01) | |
| C08L 69/00 | (2006.01) | |
| C08J 7/04 | (2020.01) | |
| C08J 7/043 | (2020.01) | |
| B29K 69/00 | (2006.01) | |
| B29L 9/00 | (2006.01) | |

(52) U.S. Cl.
CPC ........ B29C 67/246 (2013.01); B29C 45/0001 (2013.01); B29C 45/1679 (2013.01); C08J 7/043 (2020.01); C08J 7/0427 (2020.01); C08L 69/00 (2013.01); B29K 2069/00 (2013.01); B29L 2009/005 (2013.01); C08J 2369/00 (2013.01); C08J 2425/12 (2013.01); C08J 2451/04 (2013.01); C08J 2475/04 (2013.01); C08J 2487/00 (2013.01); C08L 2205/035 (2013.01); C08L 2205/08 (2013.01)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,365 A | 4/1962 | Schnell et al. |
| 3,148,172 A | 9/1964 | Fox |
| 3,271,367 A | 9/1966 | Schnell et al. |
| 3,644,574 A | 2/1972 | Jackson, Jr. et al. |
| 3,692,744 A | 9/1972 | Rich et al. |
| 3,879,348 A | 4/1975 | Serini et al. |
| 4,013,613 A | 3/1977 | Abolins et al. |
| 4,028,434 A | 6/1977 | Konter et al. |
| 4,176,224 A | 11/1979 | Bier et al. |
| 4,218,543 A | 8/1980 | Weber et al. |
| 4,982,014 A | 1/1991 | Freitag et al. |
| 5,097,002 A | 3/1992 | Sakashita et al. |
| 5,340,905 A | 8/1994 | Kühling et al. |
| 5,717,057 A | 2/1998 | Sakashita et al. |
| 6,461,732 B1 | 10/2002 | Wittmann et al. |
| 6,596,840 B1 | 7/2003 | Kratschmer et al. |
| 6,740,730 B1 | 5/2004 | Kratschmer et al. |
| 7,071,284 B2 | 7/2006 | Kauth et al. |
| 8,470,216 B2 | 6/2013 | Drube et al. |
| 8,852,744 B2 | 10/2014 | Eckel et al. |
| 9,238,320 B2 | 1/2016 | Seidel et al. |
| 10,138,370 B2 | 11/2018 | Hufen et al. |
| 2011/0135934 A1* | 6/2011 | Seidel ................. B29C 45/78 428/412 |
| 2016/0244608 A1 | 8/2016 | Hufen et al. |
| 2016/0251513 A1 | 9/2016 | Hufen et al. |

FOREIGN PATENT DOCUMENTS

| | | |
|---|---|---|
| DE | 1900270 A1 | 11/1969 |
| DE | 1570703 A1 | 2/1970 |
| DE | 2035390 A1 | 1/1971 |
| DE | 2036052 A1 | 1/1972 |
| DE | 2063050 A1 | 7/1972 |
| DE | 2211956 A1 | 4/1973 |

(Continued)

OTHER PUBLICATIONS

Machine translation of JP 2014/025037 (Year: 2014).*

(Continued)

*Primary Examiner* — Robert T Butcher
(74) *Attorney, Agent, or Firm* — The Webb Law Firm

(57) ABSTRACT

The invention relates to a composite component that has improved bonding properties and includes a substrate (i) made of a thermoplastic polymer blend composition, and a coating (ii); in a layer located 5 to 10 μm below the boundary surface between the substrate (i) and the coating (ii), the substrate (i) has a dispersed, non-lamellar phase structure. The invention also relates to a method for manufacturing the composite component.

17 Claims, 3 Drawing Sheets

(56) References Cited

FOREIGN PATENT DOCUMENTS

| | | | |
|---|---|---|---|
| DE | 2248242 A1 | 4/1973 |
| DE | 2407567 | 9/1975 |
| DE | 2407776 A1 | 9/1975 |
| DE | 2442101 A1 | 3/1976 |
| DE | 2646141 | 4/1978 |
| DE | 2715932 A1 | 10/1978 |
| DE | 2844902 | 4/1980 |
| DE | 3832396 A1 | 2/1990 |
| DE | 102006033059 A1 | 1/2008 |
| FR | 1561518 A | 3/1969 |
| GB | 1122003 A | 7/1968 |
| GB | 1229482 A | 4/1971 |
| GB | 1367790 | 9/1974 |
| JP | S6162039 A | 3/1986 |
| JP | S6162040 A | 3/1986 |
| JP | S61105550 A | 5/1986 |
| JP | 2014/025037 | * | 2/2014 |
| WO | WO-9920464 A1 | 4/1999 |
| WO | WO-0105866 A1 | 1/2001 |
| WO | WO-0105867 | 1/2001 |
| WO | WO-200400905 A1 | 12/2003 |
| WO | WO-2004063249 A1 | 7/2004 |
| WO | WO-2011015286 A1 | 2/2011 |
| WO | WO-2011070043 A1 | 6/2011 |
| WO | WO-2011070044 A1 | 6/2011 |
| WO | WO-2015055561 A1 | 4/2015 |
| WO | WO-2015055577 A1 | 4/2015 |
| WO | WO-2015055719 A1 | 4/2015 |

OTHER PUBLICATIONS

International Search Report for PCT/EP2017/084281 dated Apr. 9, 2018.

Written Opinion of the International Searching Authority for PCT/EP2017/084281 dated Apr. 9, 2018.

* cited by examiner

COMPOSITE COMPONENT

CROSS-REFERENCE TO RELATED APPLICATIONS

This application is a national stage application (under 35 U.S.C. § 371) of PCT/EP2017/084281, filed Dec. 22, 2017, which claims benefit of European Application No. 16207039.5, filed Dec. 28, 2016, both of which are incorporated herein by reference in their entirety.

The present invention relates to a composite part containing a carrier made of a polycarbonate composition and a surface coating and to a process for producing the composite part.

Composite parts are used for numerous applications in the fields of rail, aerospace or motor vehicles and also in the electricals/electronics sector. Such components are produced, for example, by initially producing a carrier in an injection molding process and providing this carrier with a decorative and/or functional coating on at least one side in a second step. The coating can serve to improve esthetic appearance or surface properties, such as the scratch resistance, haptics, surface conductivity or lightfastness of the component.

The coating can be applied by various methods such as spray painting, electroplating, foaming, film insert molding or 2K RIM direct coating.

An essential requirement for composite parts is a stable two-component structure and the retaining of this structure even under mechanical loads or under the influence of aging effects. Thus, for instance, scratches that penetrate the surface coating down to the carrier material must not lead to a detachment of the coating as a result of the surface defect.

The quality of structure retainment is often referred to as composite adhesion. It is generally reported as the force required to peel off the coating. In the context of the present application this designation is used regardless of whether excessive stress results only in separation of the surface coating and the carrier layer (adhesive fracture behavior) or in interface-proximate fracture failure within the carrier material or in the coating (cohesive fracture failure in the carrier/in the coating). Such a distinction is phenomenologically visually undifferentiable, i.e. special, for example microscopic and/or physicochemical, analytical techniques are needed to distinguish the mechanism and location of fracture.

Numerous publications describe how good composite adhesion can be achieved.

DE 10 2006 033 059 A1 discloses composite parts consisting of polycarbonate (PC)/ABS or polyamide/ABS molding materials as a carrier and a polyurethane-based coating produced in a two-component reactive injection molding process in which to improve composite adhesion the carrier surface was pretreated with a primer or subjected to a laser, corona or plasma treatment.

Journal of Applied Polymer Science, Vol. 104, 479-488 (2007) discloses studies on the adhesion of polyurethane foams to polycarbonate/ABS blends. The maximum disclosed composite strengths are 0.30+/−0.05 N/mm, all limited by the tear strength of the polyurethane foam.

WO 2011/070043 A1 and WO 2011/070044 A1 describe composite parts having improved composite strength and a two-component reactive injection molding process for the production of polyurethane-coated components made of PC/ABS molding materials having improved composite strength in which in a first process step a carrier made of a thermoplastic PC/ABS composition is injected in a first cavity and subsequently cooled and thus consolidated, in a second process step the cavity of the injection mold is enlarged to produce a gap and finally in a third process step a reactive polyurethane raw material mixture containing a polyisocyanate and a polyfunctional H-active compound is injected into the thus-produced gap, wherein the mixture is end-polymerized to afford a compact polyurethane layer or a polyurethane foam layer in contact with the surface of the thermoplastic carrier. The applications disclose that an improved composite strength of the polyurethane skin to the PC/ABS carrier results provided that PC/ABS compositions having a high polycarbonate content/a high rubber content are used in the first process step. However, such compositions have a high melt viscosity and thus often inadequate processability in the injection molding process.

WO 2015055577 A1 describes polycarbonate/ABS compositions having improved paint adhesion and composite parts composed of a carrier made of such compositions and a polyurethane-based coating, wherein based on the sum of polycarbonate and ABS content the PC/ABS composition contains 10 to 20 parts by weight of polybutadiene rubber and 12 to 23 parts by weight of free, rubber-free SAN.

WO 2015055719 A1 describes polycarbonate compositions having improved adhesion to polyurethane systems and composite parts composed of a carrier made of such compositions and a polyurethane-based coating, wherein the PC composition contains polycarbonate, polyalkylene terephthalate and a mixture of polybutadiene rubber-containing graft polymer and butadiene-free vinyl (co)polymer and based on the sum of the abovementioned polymeric constituents of the composition contains 8 to 18 parts by weight of polybutadiene and 3 to 12 parts by weight of butadiene-free vinyl (co)polymer.

WO 2015055561 A1 discloses flame-retardant polycarbonate/ABS compositions having improved adhesion to polyurethane systems and composite parts composed of a carrier made of such compositions and a polyurethane-based coating, wherein the PC/ABS composition contains polycarbonate, a mixture of polybutadiene rubber-containing graft polymer and butadiene-free vinyl (co)polymer and a phosphorus-containing flame retardant and based on the sum of the abovementioned constituents of the composition contains 0.5 to 5.5 parts by weight of polybutadiene and 0.5 to 5.0 parts by weight of butadiene-free vinyl (co)polymer.

WO 99/20464 discloses composite parts having improved composite adhesion after an alternating climate test consisting of a carrier made of a PC/ABS composition containing finely divided metal oxides and a polyurethane foam coating.

WO 2011015286 A1 discloses composite parts having improved composite adhesion consisting of a carrier made of a polycarbonate/ABS composition which has been foamed by a chemical or physical process during injection molding and a polyurethane coating applied thereto in a reactive injection molding process.

The disclosed composite parts obtain their good adhesion properties from particular compositions of the carrier material or a pretreatment of the carrier surface. This is associated with a limited performance profile or a more complex manufacturing process.

It was therefore desirable to provide parts having good composite adhesion which are producible in simple fashion and where the carrier material may be produced from a wide composition range.

In a preferred embodiment the composite adhesion in the composite parts according to the invention should be at least 0.8 N/mm, particularly preferably at least 1.0 N/mm, measured on strip specimens taken from the part and having a width of 20 mm in a roller peel test according to DIN EN 1464 (2010 version) at a test speed of 100 mm/min. This means that both the strength of the carrier material and the strength of the coating material and also the adhesion strength in the boundary layer between the carrier and the coating exceed this value.

It has now been found that, surprisingly, the desired properties are exhibited by composite parts containing
(i) a carrier made of a thermoplastic composition containing at least the following constituents
  A) 45% to 90% by weight, preferably 50% to 80% by weight, particularly preferably 55% to 75% by weight, in each case based on the sum of all constituents of the composition, of at least one representative selected from the group consisting of polycarbonate, polyester, polyester carbonate and polyamide, preferably selected from the group consisting of polycarbonate, polyester and polyester carbonate, particularly preferably polycarbonate, in particular aromatic polycarbonate,
  B) 10% to 55% by weight, preferably 19.9% to 49.9% by weight, particularly preferably 24.8% to 44.8% by weight, in each case based on the sum of all constituents of the composition, of rubber-modified vinyl (co) polymer containing
    B.1) one or more graft polymers of
      B.1.1) 10% to 80% by weight of at least one vinyl monomer on
      B.1.2) 20% to 90% by weight of one or more rubber-like graft substrates,
      wherein the polymer chains formed from the monomers B.1.1) are chemically bonded to the graft substrate B.1.2) or are enclosed in the graft substrate such that during production and processing of the compositions according to the invention they do not escape from this graft substrate and
    B.2) one or more rubber-free (co)polymers of at least one vinyl monomer and
  C) 0% to 30% by weight, preferably 0.1% to 20% by weight, particularly preferably 0.2% to 10% by weight, in each case based on the sum of all constituents of the composition, of one or more polymer additives,
  wherein the content of rubber B.1.2) based on the component B) is 10% to 40% by weight, preferably 15% to 35% by weight, particularly preferably 20% to 30% by weight,
  and wherein the component B) contains at least 20% by weight, preferably at least 30% by weight, particularly preferably at least 40% by weight, in each case based on the component B), of vinyl (co)polymer B.2) not chemically bonded to the graft substrate or enclosed in this graft substrate
  and
(ii) at least one single- or multi-ply coating in direct contact with this carrier selected from at least one representative of the group consisting of polymer coating and metal coating, preferably of polymer coating, particularly preferably polyurethane coating,
wherein in a layer which is 5 to 10 µm below the interface of the carrier (i) with the coating (ii) the carrier (i) has a phase structure which is characterized in that the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <10, preferably <7, in particular <5.

The carrier is a molded article which in a preferred embodiment is produced by an injection molding process.

In a preferred embodiment the carrier used for the two-component part already has the above described phase structure before the coating process.

The invention also provides a process for producing the composite parts in which a carrier made of a composition as described above is coated. In a preferred embodiment this process employs a carrier having the above-described phase structure.

The above-described phase structure may be achieved in various ways, it being immaterial to the invention which procedure is chosen.

Possible procedures are the use of compositions containing phase compatibilizers as a constituent of component C), use of suitable process parameters in the production of the carrier such as for example low shear rates and/or high mold temperatures, heat-treating of the carrier, preferably above the glass transition temperatures of the components A) and B), before coating and swelling of the carrier surface in suitable solvents before coating.

Components of the Carrier Material (I)
Component A

Component A) is a thermoplastic or a mixture of different thermoplastics selected from at least one polymer from the group consisting of polycarbonate, polyester carbonate, polyester and polyamide.

In a preferred embodiment component A) is selected from at least one polymer from the group consisting of polycarbonate, polyester carbonate and polyester.

In accordance with the invention the term "polycarbonate" is to be understood as meaning both homopolycarbonates and copolycarbonates. These polycarbonates may be linear or branched in the familiar manner. Also employable according to the invention are mixtures of polycarbonates.

A portion, up to 80 mol %, preferably from 20 mol % up to 50 mol %, of the carbonate groups in the polycarbonates used in accordance with the invention may have been replaced by aromatic dicarboxylic ester groups. Such polycarbonates, which contain both acid radicals of carbonic acid and acid radicals of aromatic dicarboxylic acids incorporated into the molecular chain, are referred to as aromatic polyester carbonates.

Replacement of the carbonate groups by the aromatic dicarboxylic ester groups proceeds essentially stoichiometrically and also quantitatively and the molar ratio of the reaction partners is therefore also reflected in the final polyester carbonate. The aromatic dicarboxylic ester groups can be incorporated either randomly or blockwise.

The thermoplastic polycarbonates including the thermoplastic aromatic polyester carbonates have average molecular weights Mw determined by GPC (gel permeation chromatography in methylene chloride with a polycarbonate standard) of 15 000 g/mol to 50 000 g/mol, preferably of 20 000 g/mol to 35 000 g/mol, particularly preferably of 23 000 g/mol to 33 000 g/mol.

The production of the polycarbonates and polyester carbonates is carried out in known fashion from diphenols, carbonic acid derivatives and optionally chain terminators and branching agents.

Particulars pertaining to the production of polycarbonates are disclosed in many patent documents spanning approximately the last 40 years. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverné, BAYER AG, "Polycarbonates" in Encyclopedia of Polymer Science and Engineering, Volume 11, Second Edition, 1988, pages 648-718, and finally to U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

The production of aromatic polycarbonates is effected for example by reaction of diphenols with carbonic halides, preferably phosgene, and/or with aromatic dicarbonyl dihalides, preferably benzenedicarbonyl dihalides, by the interfacial process, optionally using chain terminators and optionally using trifunctional or more than trifunctional branching agents, production of the polyester carbonates being achieved by replacing a portion of the carbonic acid derivatives with aromatic dicarboxylic acids or derivatives of the dicarboxylic acids, specifically with aromatic dicarboxylic ester structural units according to the carbonate structural units to be replaced in the aromatic polycarbonates. Production via a melt polymerization process by reaction of diphenols with diphenyl carbonate for example is likewise possible.

Dihydroxyaryl compounds suitable for the production of polycarbonates are those of formula (1)

$$HO-Z-OH \quad (1),$$

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

It is preferable when Z in formula (1) is a radical of the formula (2)

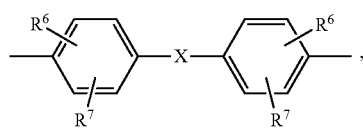

in which $R^6$ and $R^7$ independently of one another represent H, $C_1$- to $C_{18}$-alkyl, $C_1$- to $C_{18}$-alkoxy, halogen such as Cl or Br or in each case optionally substituted aryl- or aralkyl, preferably H or $C_1$- to $C_{12}$-alkyl, particularly preferably H or $C_1$- to $C_8$-alkyl and very particularly preferably H or methyl, and X represents a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else represents $C_6$- to $C_{12}$-arylene which may optionally be fused to further aromatic rings containing heteroatoms.

It is preferable when X represents a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of formula (2a)

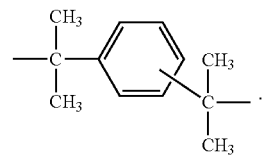

Diphenols suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred diphenols are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and further suitable diphenols are described, for example, in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one diphenol is employed and in the case of copolycarbonates two or more diphenols are employed. The diphenols employed, similarly to all other chemicals and auxiliaries added to the synthesis, may be contaminated with the contaminants originating from their own synthesis, handling and storage. However, it is desirable to use raw materials of the highest possible purity.

Suitable carbonic acid derivatives are for example phosgene and diphenyl carbonate.

Suitable chain terminators that may be used in the production of polycarbonates are monophenols. Suitable monophenols are for example phenol itself, alkylphenols such as cresols, p-tert-butylphenol, cumylphenol and mixtures thereof.

Preferred chain terminators are phenols which are mono- or polysubstituted with linear or branched, preferably unsubstituted $C_1$ to $C_{30}$ alkyl radicals or with tert-butyl. Particularly preferred chain terminators are phenol, cumylphenol and/or p-tert-butylphenol.

The amount of chain terminator to be employed is preferably 0.1 to 5 mol % based on moles of diphenols employed in each case. The addition of the chain terminators may be carried out before, during or after the reaction with a carbonic acid derivative.

Suitable branching agents are the trifunctional or more than trifunctional compounds known in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra(4-(4-hydroxyphenylisopropyl)phenoxy)methane and 1,4-bis((4',4''-dihydroxytriphenyl)methyl)benzene and 3,3-bis(3-methyl-4-hydroxyphenyl)-2-oxo-2,3-dihydroindole.

The amount of the branching agents for optional use is preferably from 0.05 mol % to 2.00 mol % based on moles of diphenols used in each case.

The branching agents can either be initially charged with the diphenols and the chain terminators in the aqueous alkaline phase or added dissolved in an organic solvent before the phosgenation. In the case of the transesterification process, the branching agents are employed together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Preferred modes of production of the polycarbonates, including the polyester carbonates, to be used according to the invention are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

To incorporate additives into the composition the component A) or a portion of the component A) may be employed in the form of powders.

Suitable polyesters in a preferred embodiment are aromatic, and they are further preferably polyalkylene terephthalates.

In a particularly preferred embodiment, these are reaction products of aromatic dicarboxylic acids or reactive derivatives thereof, such as dimethyl esters or anhydrides, and aliphatic, cycloaliphatic or araliphatic diols and also mixtures of these reaction products.

Particularly preferred aromatic polyalkylene terephthalates contain at least 80% by weight, preferably at least 90% by weight, based on the dicarboxylic acid component, of terephthalic acid radicals and at least 80% by weight, preferably at least 90% by weight, based on the diol component, of ethylene glycol and/or butane-1,4-diol radicals.

In addition to terephthalic acid radicals the preferred aromatic polyalkylene terephthalates may contain up to 20 mol %, preferably up to 10 mol %, of radicals of other aromatic or cycloaliphatic dicarboxylic acids having 8 to 14 carbon atoms or of aliphatic dicarboxylic acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred aromatic polyalkylene terephthalates may contain not only ethylene glycol and/or butane-1,4-diol radicals but also up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-hydroxyethoxyphenyl)propane and 2,2-bis(4-hydroxypropoxyphenyl)propane (DE-A 2 407 674, 2 407 776, 2 715 932).

The aromatic polyalkylene terephthalates may be branched through incorporation of relatively small amounts of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particular preference is given to aromatic polyalkylene terephthalates which have been prepared solely from terephthalic acid and the reactive derivatives thereof (e.g. the dialkyl esters thereof) and ethylene glycol and/or butane-1,4-diol, and to mixtures of these polyalkylene terephthalates.

Preferred mixtures of aromatic polyalkylene terephthalates contain 1% to 50% by weight, preferably 1% to 30% by weight, of polyethylene terephthalate and 50% to 99% by weight, preferably 70% to 99% by weight, of polybutylene terephthalate.

The preferably used aromatic polyalkylene terephthalates have a viscosity number of 0.4 to 1.5 dVg, preferably 0.5 to 1.2 dl/g, measured in phenol/o-dichlorobenzene (1:1 parts by weight) in a concentration of 0.05 g/ml according to ISO 307 at 25° C. in an Ubbelohde viscometer.

The aromatic polyalkylene terephthalates can be prepared by known methods (see, for example, Kunststoff-Handbuch [Plastics Handbook], volume VIII, p. 695 et seq., Carl-Hanser-Verlag, Munich 1973).

In a further embodiment of the present invention amorphous and/or semicrystalline polyamides are used as the thermoplastic polymer of component A).

In a preferred embodiment the compositions are free from polycarbonates, polyester carbonates and polyesters when polyamides are used as component A).

Suitable polyamides are aliphatic polyamides, for example PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6 copolyamide, PA-6/12 copolyamide, PA-6/11 copolyamide, PA-6,6/11 copolyamide, PA-6,6/12 copolyamide, PA-6/6,10 copolyamide, PA-6,6/6,10 copolyamide, PA-4,6/6 copolyamide, PA-6/6,6/6,10 terpolyamide, and copolyamide formed from cyclohexane-1,4-dicarboxylic acid and 2,2,4- and 2,4,4-trimethylhexamethylenediamine, aromatic polyamides, for example PA-6,1, PA-6,1/6,6 copolyamide, PA-6, T, PA-6, T/6 copolyamide, PA-6, T/6,6 copolyamide, PA-6,1/6, T copolyamide, PA-6,6/6, T/6,1 copolyamide, PA-6, T/2-MPMDT copolyamide (2-MPMDT=2-methylpentamethylenediamine), PA-9, T, copolyamide formed from terephthalic acid, 2,2,4- and 2,4,4-trimethylhexamethylenediamine, copolyamide formed from isophthalic acid, laurolactam and 3,5-dimethyl-4,4-diaminodicyclohexylmethane, copolyamide formed from isophthalic acid, azelaic acid and/or sebacic acid and 4,4-diaminodicyclohexylmethane, copolyamide formed from caprolactam, isophthalic acid and/or terephthalic acid and 4,4-diaminodicyclohexylmethane, copolyamide formed from caprolactam, isophthalic acid and/or terephthalic acid and isoplioronediamine, copolyamide formed from isophthalic acid and/or terephthalic acid and/or further aromatic or aliphatic dicarboxylic acids, optionally alkyl-substituted hexamethylenediamine and alkyl-substituted 4,4-diaminodicyclohexylamine or copolyamides thereof, and mixtures of the aforementioned polyamides.

When polyamides are used it is preferable to use as component A) semicrystalline polyamides having advantageous thermal properties. Employed here are semicrystalline polyamides having a melting point of at least 200° C., preferably of at least 220° C., more preferably of at least 240° C. and yet more preferably of at least 260° C. The higher the melting point of the semicrystalline polyamides the more advantageous the thermal behavior of the carrier material. The melting point is determined by DSC.

Preferred semicrystalline polyamides are selected from the group containing PA-6, PA-6,6, PA-6,10, PA-4,6, PA-11, PA-12, PA-12,12, PA-6,1, PA-6, T, PA-6, T/6,6 copolyamide, PA-6, T/6 copolyamide, PA-6/6,6 copolyamide, PA-6,6/6, T/6,1 copolyamide, PA-6, T/2-MPMDT copolyamide, PA-9, T, PA-4,6/6 copolyamide and mixtures or copolyamides thereof.

In a preferred embodiment either polyamide or at least one polymer selected from the group consisting of polycarbonate, polyester and polyester carbonate is employed as component A.

In a more preferred embodiment precisely one polymer selected from the group consisting of polycarbonate, polyester and polyester carbonate is employed as component A.

It is most preferable to use as component A aromatic polycarbonate based on bisphenol A.

Component B

Component B) is a rubber-modified vinyl (co)polymer.

Component B) comprises one or more graft polymers as component B.1) and rubber-free vinyl (co)polymer not chemically bonded to a rubber or enclosed in this rubber as component B.2).

Component B.1)

The component B.1) comprises one or more graft polymers of

B.1.1 10% to 80% by weight, preferably 20% to 70% by weight, particularly preferably 25% to 55% by weight, of at least one vinyl monomer and B.1.2 20% to 90% by weight, preferably 30% to 80% by weight, particularly preferably 45% to 75% by weight, of one or more rubber-like, preferably particulate, graft substrates, preferably having glass transition temperatures <10° C., more preferably <0° C., particularly preferably <−20° C., wherein the polymer chains formed from the monomers B.1.1) are chemically bonded to the graft substrate B.1.2) or are enclosed in the graft substrate such that during production and processing of the compositions according to the invention they do not escape from this graft substrate.

Glass transition temperature is determined by differential scanning calorimetry (DSC) according to the standard DIN EN 61006 (2004 version) at a heating rate of 10 K/min where Tg is defined as the mid-point temperature (tangent method).

The preferred particulate graft substrates B.1.2) generally have an average particle size (d50 value) of 0.05 to 10 µm, preferably 0.1 to 5 µm, particularly preferably 0.2 to 1.5 µm.

The average particle size d50 is the diameter above which and below which 50% by weight of the particles respectively lie. It can be determined by ultracentrifugation (W. Scholtan, H. Lange, Kolloid, Z. und Z. Polymere [polymers] 250 (1972), 782-1796).

Monomers B.1.1 are preferably mixtures of

B.1.1.1 50% to 99% by weight, preferably 65% to 85% by weight, preferably 70% to 80% by weight, in each case based on the entirety of the monomers of the graft sheath B.1.1, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate and butyl acrylate, and B.1.1.2 1% to 50% by weight, preferably 15% to 35% by weight, particularly preferably 20% to 30% by weight, in each case based on the entirety of the monomers of the graft sheath B.1.1, of vinyl cyanides (unsaturated nitriles such as acrylonitrile and methacrylonitrile) and/or (C1-C8)-alkyl (meth)acrylates, such as methyl methacrylate, n-butyl acrylate, t-butyl acrylate, and/or derivatives (such as anhydrides and imides) of unsaturated carboxylic acids, for example maleic anhydride and N-phenylmaleimide.

Preferred monomers B.1.1.1 are selected from at least one of the monomers styrene, α-methylstyrene and methyl methacrylate. Preferred monomers B.1.1.2 are selected from at least one of the monomers acrylonitrile, n-butyl acrylate, maleic anhydride and methyl methacrylate.

Particularly preferred monomers are B.1.1.1 styrene and 8.1.1.2 acrylonitrile.

Graft substrates B.1.2) suitable for the graft polymers B.1) are for example diene rubbers, EP(D)M rubbers, i.e. those based on ethylene/propylene and optionally diene, acrylate, polyurethane, silicone, chloroprene, ethylene/vinyl acetate rubbers and also silicone/acrylate composite rubbers.

Preferred graft substrates B.1.2) are diene rubbers, for example based on butadiene and isoprene, or mixtures of diene rubbers or copolymers of diene rubbers or mixtures thereof with further copolymerizable monomers (for example according to B.1.1.1 and B.1.1.2).

Particularly preferred as graft substrate B.1.2) is pure polybutadiene rubber.

Particularly preferred graft polymers B.1) are for example ABS polymers as described for example in DE-A 2 035 390 (=U.S. Pat. No. 3,644,574) or in DE-A 2 248 242 (=GB-B 1 409 275), or in Ullmanns Enzyklopidie der Technischen Chemie, Vol. 19 (1980), p. 280 et seq.

The graft copolymers B.1) are produced by free-radical polymerization, for example by emulsion, suspension, solution or bulk polymerization.

The gel content of the graft substrate B.1.2) is determined at 25° C. in a suitable solvent as content insoluble in these solvents (M. Hoffmann, H. Krömer, R. Kuhn, Polymeranalytik I und II, Georg Thieme-Verlag, Stuttgart 1977).

As is well known, during grafting the graft monomers B.1.1) are not necessarily grafted onto the graft substrate completely. Products of grafting reactions thus often still contain significant proportions of free (i.e. not chemically bonded to the graft substrate and not irreversibly enclosed in the graft substrate) copolymer having a composition analogous to that of the graft sheath. In the context of the present invention component B.1) is to be understood as meaning exclusively the graft polymer as defined above while the copolymer not chemically bonded to the graft substrate and not enclosed in this graft substrate which is present as a consequence of manufacture is assigned to component B.2).

The proportion of this free copolymer in products of grafting reactions may be determined from the gel contents thereof (proportion of free copolymer=100% by weight−gel content of the product in % by weight), wherein the gel content is determined at 25° C. in a suitable solvent (such as for instance acetone, M. Hoffmann, H. Krömer, R. Kuhn, Polymeranalytik I und II, Georg Thieme-Verlag, Stuttgart 1977) as content insoluble in these solvents.

It is preferable when the graft polymer composed of the components B.1.1 and B.1.2 has a core-shell structure, wherein component B.1.1 forms the shell (also described as a sheath) and component B.1.2) forms the core (see for example Ullmann's Encyclopedia of Industrial Chemistry, VCH-Verlag, Vol. A21, 1992, p. 635 and p. 656).

Component B.2)

The composition contains as further component B.2) one or more rubber-free (co)polymers of at least one vinyl monomer, preferably selected from the group of vinylaromatics, vinyl cyanides (unsaturated nitriles), (C1 to C8)-alkyl (meth)acrylates, unsaturated carboxylic acids and derivatives (such as anhydrides and imides) of unsaturated carboxylic acids.

Especially suitable as component B.2) are (co)polymers of

B.2.1) 50% to 99% by weight, preferably 65% to 85% by weight, more preferably 70% to 80% by weight, based on the (co)polymer B.2), of at least one monomer selected from the group of the vinylaromatics (for example styrene, a-methylstyrene), ring-substituted vinylaromatics (for example p-methylstyrene, p-chlorostyrene) and (C1-C8)-alkyl (meth)acrylates (for example methyl methacrylate, n-butyl acrylate, tert-butyl acrylate) and B.2.2) 1% to 50% by weight, preferably 15% to 35% by weight, more preferably 20% to 30% by weight, based on the (co)polymer B.2), of at least one monomer selected from the group of vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers B.2) are resin-like, thermoplastic and rubber-free. Particular preference is given to the copolymer of B2.1) styrene and B2.2) acrylonitrile.

Such (co)polymers B.2) are known and can be prepared by free-radical polymerization, in particular by emulsion, suspension, solution or bulk polymerization.

The (co)polymers B.2) have a weight-average molecular weight (Mw) determined by gel permeation chromatography with a polystyrene standard of preferably 50 000 to 200 000 g/mol, particularly preferably of 70 000 to 170 000 g/mol, very particularly preferably of 80 000 to 130 000 g/mol.

Component C

The carrier may optionally contain as component C) one or more polymer additives preferably selected from the group consisting of flame retardants, anti-drip agents, flame retardant synergists, smoke inhibitors, lubricants and demolding agents, nucleating agents, antistats, conductivity additives, stabilizers (e.g. hydrolysis, heat aging and UV stabilizers and also transesterification inhibitors), flow promoters, phase compatibilizers, further impact modifiers distinct from component B) (either with or without a core-shell structure), further polymeric constituents distinct from components A) and B) (for example functional blend partners), fillers and reinforcers and dyes and pigments.

In a preferred embodiment the composition contains at least one polymer additive selected from the group consisting of lubricants and demolding agents, stabilizers, flow promoters, phase compatibilizers, further impact modifiers, further polymeric constituents, dyes and pigments.

In a preferred embodiment the composition contains pentaerythritol tetrastearate as a demolding agent.

In a preferred embodiment the composition contains at least one phase compatibilizer. Preferred phase compatibilizers are graft or block copolymers containing blocks of polymers of component A and blocks of polymers of component B.2), optionally containing further vinyl monomers having reactive groups such as anhydride groups or epoxide groups, preferably glycidyl methacrylate.

In a preferred embodiment the composition contains as a stabilizer at least one representative selected from the group consisting of sterically hindered phenols, organic phosphites and sulfur-based co-stabilizers.

In a particularly preferred embodiment the composition contains as a stabilizer at least one representative selected from the group consisting of octadecyl 3-(3,5-di-tert-butyl-4-hydroxyphenyl)propionate and tris(2,4-di-tert-butylphenyl) phosphite.

Structure of the Surface Coating (ii)

Employed as the coating (ii) in the context of the present invention is a single- or multi-ply coating in direct contact with the carrier and selected from at least one representative of the group consisting of polymer layers and metal layers.

Employed as the coating in a preferred embodiment is a polymer coating, more preferably a polyurethane foam or a compact polyurethane layer, and in a particularly preferred embodiment is a compact polyurethane layer.

In a preferred embodiment the polyurethane layer is end-polymerized in direct contact with the carrier.

In a particularly preferred embodiment the polyurethane layer is applied to the carrier by a 2K RIM direct coating process, i.e.
  (i) in a first process step the melt of the thermoplastic composition is injected into a first mold cavity and subsequently cooled,
  (ii) in a second process step the cavity of the injection molding tool is enlarged to produce a gap,
  (iii) in the third process step there is injected into the thus-resulting gap between the thermoplastic part and the mold surface of the enlarged cavity a reactive polyurethane raw material mixture containing
    at least one polyisocyanate component,
    at least one polyfunctional H-active compound and
    optionally at least one polyurethane additive and/or processing auxiliary,
  wherein the polyurethane raw material mixture is end-polymerized to afford a compact polyurethane layer or a polyurethane foam layer in contact with the surface of the thermoplastic carrier,
  (iv) in the fourth process step the composite part is demolded from the mold cavity, wherein the process steps (ii) and (iii) may be repeated multiple times and wherein the process steps follow in immediate succession.

An alternative embodiment which is particularly suitable for thermoplastic polyurethanes is the polymerization of the polyurethane in a first process step followed by a second process step in which the polyurethane layer is applied to the carrier in a two-component injection molding procedure. A further alternative embodiment is the production of a polyurethane film in a first process step followed by a second process step in which this film is subjected to film-insert molding with the polycarbonate composition of the carrier (i).

The polyurethanes employed according to the invention are obtained by reacting polyisocyanates with H-active polyfunctional compounds, preferably polyols.

In the context of the present invention the term "polyurethane" is to be understood as also meaning polyurethane ureas in which compounds having NH functionality, optionally in admixture with polyols, are employed as H-active polyfunctional compounds.

Suitable polyisocyanates are the aromatic, araliphatic, aliphatic or cycloaliphatic polyisocyanates which have an NCO functionality of preferably ≥2 and are known per se to those skilled in the art and which may also comprise iminooxadiazinedione, isocyanurate, uretdione, urethane, allophanate, biuret, urea, oxadiazinetrione, oxazolidinone, acylurea and/or carbodiimide structures. These may be employed individually or in any desired mixtures with one another.

The abovementioned polyisocyanates are based on di- and/or triisocyanates known per se to the skilled person and having aliphatically, cycloaliphatically, araliphatically and/or aromatically bonded isocyanate groups, it being immaterial whether they were produced using phosgene or by phosgene-free processes. Examples of such di- or triisocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane (Desmodur™ W, Bayer AG, Leverkusen, DE), 4-isocyanatomethyl-1,8-octane diisocyanate (triisocyanatononane, TIN), ω,ω'-diisocyanato-1,3-dimethylcyclohexane (H6XDI), I-isocyanato-1-methyl-3-isocyanatomethylcyclohexane, 1-isocyanato-1-methyl-4-isocyanatomethylcyclohexane, bis(isocyanatomethyl)norbomane, 1,5-naphthalene diisocyanate, 1,3- and 1,4-bis(2-isocyanatoprop-2-yl)benzene (TMXDI), 2,4- and 2,6-diisocyanatotoluene (TDI), in particular the 2,4 and the 2,6 isomers, and technical mixtures of the two isomers, 2,4'- and 4,4'-diisocyanatodiphenylmethane (MDI), polymeric MDI (pMDI), 1,5-diisocyanatonaphthalene, 1,3-bis(isocyanatomethyl)benzene (XDI) and any desired mixtures of the recited compounds.

It is preferable when the polyisocyanates have an average NCO functionality of 2.0 to 5.0, preferably of 2.2 to 4.5, particularly preferably of 2.2 to 2.7, and a content of isocyanate groups of 5.0% to 37.0% by weight, preferably of 14.0% to 34.0% by weight.

In a preferred embodiment polyisocyanates or polyisocyanate mixtures of the abovementioned type having exclusively aliphatically and/or cycloaliphatically bonded isocyanate groups are employed.

It is very particularly preferred when the polyisocyanates of the abovementioned type are based on hexamethylene diisocyanate, isophorone diisocyanate, the isomeric bis(4,4'-isocyanato-cyclohexyl)methanes and mixtures thereof.

Of interest among the higher molecular weight, modified polyisocyanates are in particular the terminal isocyanate-containing prepolymers in the molecular weight range 400 to 15 000, preferably 600 to 12 000, which are known from polyurethane chemistry. These compounds are produced in a manner known per se by reaction of excess amounts of simple polyisocyanates of the type recited by way of example with organic compounds having at least two isocyanate-reactive groups, in particular organic polyhydroxyl compounds. Suitable polyhydroxyl compounds of this type include not only simple polyhydric alcohols in the molecular weight range 62 to 599, preferably 62 to 200, for example ethylene glycol, trimethylolpropane, 1,2-propanediol or 1,4-butanediol or 2,3-butanediol, but in particular higher molecular weight polyether polyols and/or polyester polyols of the type known per se from polyurethane chemistry having molecular weights of 600 to 12 000, preferably 800 to 4000, and having at least two, generally 2 to 8, but preferably 2 to 6, primary and/or secondary hydroxyl groups. It will be appreciated that it is also possible to employ NCO prepolymers produced for example from low molecular weight polyisocyanates of the type recited by way of example and less preferred compounds having isocyanate-reactive groups such as for example polythioether polyols, hydroxyl-containing polyacetals, polyhydroxypolycarbonates, hydroxyl-containing polyesteramides or hydroxyl-containing copolymers of olefinically unsaturated compounds.

Compounds having isocyanate-reactive groups, in particular hydroxyl groups, suitable for producing the NCO prepolymers are, for example, the compounds disclosed in U.S. Pat. No. 4,218,543. During production of the NCO prepolymers these compounds having isocyanate-reactive groups are reacted with simple polyisocyanates of the type exemplarily recited above while maintaining an NCO excess. The NCO prepolymers generally have an NCO content of 10% to 26% by weight, preferably 15% to 26% by weight. It is apparent from the above that in the context of the present invention the terms "NCO prepolymers" and "prepolymers having terminal isocyanate groups" are to be understood as meaning both the reaction products as such and also the mixtures with excess amounts of unconverted starting polyisocyanates often also known as "semiprepolymers".

Contemplated as aliphatic diols having an OH number of >500 mg KOH/g are the chain extenders customarily used in polyurethane chemistry, such as ethylene glycol, diethylene glycol, propylene glycol, dipropylene glycol, 1,4-butanediol, 1,3-propanediol. Diols such as 1,4-butanediol, 1,3-butanediol, 2,3-butanediol and/or 2-methyl-1,3-propanediol are preferred. It will be appreciated that it is also possible to employ the aliphatic diols in admixture with one another.

Suitable H-active components include polyols having an average OH number of 5 to 600 mg KOH/g and an average functionality of 2 to 6. Polyols suitable according to the invention include for example polyhydroxypolyethers obtainable by alkoxylation of suitable starter molecules such as ethylene glycol, diethylene glycol, 1,4-dihydroxybutane, 1,6-dihydroxyhexane, dimethylolpropane, glycerol, pentaerythritol, sorbitol or sucrose. Likewise suitable as starters are ammonia or amines such as ethylenediamine, hexamethylenediamine, 2,4-diaminotoluene, aniline or amino alcohols or phenols such as bisphenol A. The alkoxylation is carried out in any desired sequence using propylene oxide and/or ethylene oxide or as a mixture.

Additionally present in addition to polyols may be at least one further crosslinker and/or chain extender selected from the group containing amines and amino alcohols, for example ethanolamine, diethanolamine, diisopropanolamine, ethylenediamine, triethanolamine, isophoronediamine, N,N'-dimethyl(diethyl)ethylenediamine, 2-amino-2-methyl(or ethyl)-1-propanol, 2-amino-1-butanol, 3-amino-1,2-propanediol, 2-amino-2-methyl(ethyl)-1,3-propanediol, and alcohols, for example ethylene glycol, diethylene glycol, 1,4-dihydroxybutane, 1,6-dihydroxyhexane, dimethylolpropane, glycerol and pentaerythritol, and also sorbitol and sucrose or mixtures of these compounds.

Also suitable are polyester polyols such as are obtainable by reaction of low molecular weight alcohols with polybasic carboxylic acids such as adipic acid, phthalic acid, hexahydrophthalic acid, tetrahydrophthalic acid or the anhydrides of these acids in a manner known per se provided that the viscosity of the H-active component does not become excessively large. A preferred polyol having ester groups is castor oil. Preparations comprising castor oil such as are obtainable by dissolution of resins, for example of aldehyde-ketone resins, and also modifications of castor oil and polyols based on other natural oils are also suitable.

Likewise suitable are high molecular weight polyhydroxypolyethers in which high molecular weight polyadducts or polycondensates or polymers are present in finely dispersed, dissolved or grafted form. Such modified polyhydroxyl compounds are obtained in a manner known per se, for example when polyaddition reactions (for example reactions between polyisocyanates and amino-functional compounds) or polycondensation reactions (for example between formaldehyde and phenols and/or amines) are allowed to take place in situ in the hydroxyl-containing compounds. However, it is also possible to mix a ready-to-use aqueous polymer dispersion with a polyhydroxyl compound and then remove the water from the mixture.

Polyhydroxyl compounds modified by vinyl polymers such as are obtained for example by polymerization of styrene and acrylonitrile in the presence of polyethers or polycarbonate polyols are also suitable for the production of polyurethanes. Using polyether polyols modified according to DE-A 2 442 101, DE-A 2 844 922 and DE-A 2 646 141 by graft polymerization with vinylphosphonic esters and optionally (meth)acrylonitrile, (meth)acrylamide or OH-functional (meth)acrylic acid esters affords plastics of particular flame retardancy.

Representatives of the recited compounds to be used as H-active compounds are described, for example, in High Polymers, vol. XVI, "Polyurethanes Chemistry and Technology", Saunders-Frisch (ed.) Interscience Publishers, New York, London, vol. 1, pp. 32-42, 44, 54 and vol. II, 1984, pp. 5-6 and pp. 198-199.

It is also possible to employ mixtures of the recited compounds.

The limitation to the average OH number and average functionality of the H-active component results in particular from the increasing embrittlement of the resulting polyurethane. However, those skilled in the art are in principle aware of the possibilities of influencing the polymer physics properties of polyurethane, and the NCO component, aliphatic diol and polyol can therefore be favorably adapted to one another.

The polyurethane layer (b) may be foamed or solid, for example in the form of a lacquer or coating.

All auxiliaries and additives known per se such as, for example, release agents, blowing agents, fillers, catalysts and flame retardants, may be used for the production thereof.

Optionally employable as auxiliaries and additives are:
a) Water and/or Volatile Inorganic or Organic Substances as Blowing Agents Suitable as organic blowing agents are for example acetone, ethyl acetate, halogen-substituted alkanes such as methylene chloride, chloroform, ethylidene chloride, vinylidene chloride, monofluorotrichloromethane, chlorodifluoromethane, dichlorodifluoromethane, also butane, hexane, heptane or diethyl ether, and as inorganic blowing agents air, $CO_2$ or $N_2O$. A blowing effect can also be achieved by addition of compounds which decompose with elimination of gases, for example of nitrogen, at temperatures above room temperature, for example azo compounds such as azodicarbonamide or azoisobutyronitrile.
b) Catalysts The catalysts are for example tertiary amines (such as triethylamine, tributylamine, N-methylmorpholine, N-ethylmorpholine, N,N,N',N'-tetramethylethylenediamine, pentamethyldiethylenetriamine and higher homologs, 1,4-diazabicyclo-(2,2,2)octane, N-methyl-N'-dimethylaminoethylpiperazine, bis(dimethylaminoalkyl) piperazine, N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-(-phenylethylamine, 1,2-dimethylimidazole, 2-methylimidazole, monocyclic and bicyclic amides, bis(dialkylamino) alkyl ethers, amide groups (preferably formamide groups) comprising tertiary amines, Mannich bases of secondary amines (such as dimethylamine) and aldehydes, (preferably formaldehyde or ketones such as acetone, methyl ethyl ketone or cyclohexanone) and phenols (such as phenol, nonylphenol or bisphenol), tertiary amines comprising isocyanate-active hydrogen atoms (e.g. triethanolamine, triisopropanolamine, N-methyldiethanolamine, N-ethyldiethanolamine, N,N-dimethylethanolamine) and the reaction products thereof with alkylene oxides such as propylene oxide and/or ethylene oxide, secondary/tertiary amines, silanamines having carbon-silicon bonds (2,2,4-trimethyl-2-silamorpholine and 1,3-diethylaminomethyltetramethyldisiloxane), nitrogen-containing bases (such as tetraalkylammonium hydroxides), alkali metal hydroxides (such as sodium hydroxide, alkali metal phenoxides such as sodium phenoxide), alkali metal alkoxides (such as sodium methoxide) and/or hexahydrotriazines.

The reaction between NCO groups and Zerewitinoff-active hydrogen atoms is also greatly accelerated in a manner known per se by lactams and azalactams by initially forming an adduct between the lactam and the compound comprising acidic hydrogen.

Also employable as catalysts are organic metal compounds, in particular organic tin and/or bismuth compounds. Preferably contemplated as organic tin compounds in addition to sulfur-containing compounds such as di-n-octyl tin mercaptide are tin(II) salts of carboxylic acids such as tin(II) acetate, tin(II) octoate, tin(II) ethylhexoate and tin(II) laurate and the tin(IV) compounds, for example dibutyltin oxide, dibutyltin dichloride, dibutyltin diacetate, dibutyltin dilaurate. dibutyltin maleate or dioctyltin diacetate. Organic bismuth catalysts are described in patent application WO 2004/000905 for example.

It will be appreciated that all of the abovementioned catalysts may be employed as mixtures. Of particular interest are combinations of organic metal compounds and amidines, aminopyridines or hydrazinopyridines.

The catalysts are generally used in an amount of about 0.001% to 10% by weight based on the total amount of compounds having at least two isocyanate-reactive hydrogen atoms.
c) Surface-Active Additives Such as Emulsifiers and Foam Stabilizers.

Suitable emulsifiers are for example the sodium salts of castor oil sulfonates or salts of fatty acids with amines such as diethylamine oleate or diethanolamine stearate. Alkali metal or ammonium salts of sulfonic acids such as for instance of dodecylbenzenesulfonic acid or dinaphthylmethanedisulfonic acid or of fatty acids such as ricinoleic acid or of polymeric fatty acids can also be used as surface-active additives.

Suitable foam stabilizers particularly include polyethersiloxanes, especially water-soluble representatives. The construction of these compounds is generally such that a copolymer of ethylene oxide and propylene oxide is connected to a polydimethylsiloxane radical. Of particular interest are polysiloxane-polyoxyalkylene copolymers multiply branched via allophanate groups.

d) Reaction Retarders

Suitable reaction retarders are for example acidic substances (such as hydrochloric acid or organic acid halides).

e) Additives

Contemplated PU additives are for example cell regulators of the type known per se (such as paraffins or fatty alcohols) or dimethylpolysiloxanes and pigments or dyes and flame retardants of the type known per se (for example trischloroethyl phosphate, tricresyl phosphate or ammonium phosphate and polyphosphate), also stabilizers against aging and weathering influences, plasticizers and fungistatic and bacteriostatic substances and fillers (such as barium sulfate, diatomaceous earth, carbon black or precipitated chalk).

Further examples of surface-active additives and foam stabilizers and cell regulators, reaction retarders, stabilizers, flame retardants, plasticizers, dyes and fillers and fungistatic and bacteriostatic substances for optional co-use according to the invention are known to those skilled in the art and described in the literature.

Production of the Molding Materials for the Carrier and of the Carrier Itself

The carrier compositions according to the invention can be used to produce thermoplastic molding materials.

The thermoplastic molding materials according to the invention may be produced for example by mixing the respective constituents of the compositions and melt compounding and melt extruding the resulting mixture at temperatures of preferably 200° C. to 320° C., particularly preferably at 240° C. to 300° C., in customary apparatuses such as for example internal kneaders, extruders and twin-shaft screw systems in a known manner.

The mixing of the individual constituents of the compositions may be carried out in a known manner, either successively or simultaneously, either at about 20° C. (room temperature) or at a higher temperature. This means that for example some of the constituents may be added via the main intake of an extruder and the remaining constituents may be applied subsequently in the compounding process via an ancillary extruder.

The molding materials according to the invention can be used to produce carriers of any kind. These may be produced by injection molding, extrusion and blow-molding processes for example. A further form of processing is the production of carriers by deep drawing from previously produced sheets or films.

The constituents of the compositions may also be metered directly into an injection molding machine or into an extrusion unit and processed into carriers.

Examples of composite parts according to the invention are coated films, profiles, housing parts of any kind, for example for household appliances such as juice presses, coffee machines, mixers; for office machines such as monitors, flatscreens, notebooks, printers, copiers; sheets, pipes, electrical installation ducts, windows, doors and other profiles for the building sector (interior fitout and exterior applications) and electricals and electronics parts such as switches, plugs and sockets and components for commercial vehicles, especially for the automotive sector, interior fittings for rail vehicles, ships, aircraft, buses and other motor vehicles, body parts for motor vehicles, housings of electrical appliances containing small transformers, housings for information processing and transmission apparatus, medical equipment housings and cladding, massagers and housings therefor, toy vehicles for children, sheetlike wall elements, housings for safety devices, thermally insulated transport containers, coated moldings for sanitation and bathroom equipment, grille covers for ventilation openings and housings for garden tools.

Further embodiments 1 to 27 of the present invention are described hereinbelow:

1. Composite Part Containing (i) a carrier made of a thermoplastic composition containing at least the following constituents A) 45% to 90% by weight based on the sum of all constituents of the composition of at least one polymer selected from the group consisting of polycarbonate, polyester, polyester carbonate and polyamide, B) 10% to 55% by weight based on the sum of all constituents of the composition of rubber-modified vinyl (co)polymer containing B.1) one or more graft polymers of B.1.1) 10% to 80% by weight of at least one vinyl monomer on B.1.2) 20% to 90% by weight of one or more rubber-like graft substrates, wherein the polymer chains formed from the monomers B.1.1) are chemically bonded to the graft substrate B.1.2) or are enclosed in the graft substrate such that during production and processing of the compositions according to the invention they do not escape from this graft substrate and B.2) one or more rubber-free (co)polymers of at least one vinyl monomer and C) 0% to 30% by weight based on the sum of all constituents of the composition of one or more polymer additives, wherein the rubber content B.1.2) based on the component B) is 10% to 40% by weight and wherein the component B) contains at least 20% by weight of vinyl (co)polymer B.2) not chemically bonded to the graft substrate or enclosed in this graft substrate and (ii) at least one single- or multi-ply coating in direct contact with this carrier selected from at least one representative of the group consisting of polymer coating and metal coating, wherein in a layer which is 5 to 10 μm below the interface of the carrier (i) with the coating (ii) the carrier (i) has a phase structure which is characterized in that the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <10.

2. Composite part according to embodiment 1, wherein the coating is a polyurethane coating.

3. Composite part according to either of embodiments 1 and 2, wherein the component A) is aromatic polycarbonate.

4. Composite part according to any of the preceding embodiments, wherein the content of rubber B.1.2) based on the component B) is 15% to 35% by weight.

5. Composite part according to any of the preceding embodiments, wherein the content of rubber B.1.2) based on the component B) is 20% to 30% by weight.

6. Composite part according to any of the preceding embodiments, wherein the component B) contains at least 30% by weight based on the component B) of vinyl (co)polymer B.2) not chemically bonded to the graft substrate or enclosed in this graft substrate.

7. Composite part according to any of the preceding embodiments, wherein the component B) contains at least 40% by weight based on the component B) of vinyl (co)polymer B.2) not chemically bonded to the graft substrate or enclosed in this graft substrate.

8. Composite part according to any of the preceding embodiments, wherein the content of the component B.2) based on the sum of the components A), B) and C) is in the range of 5% to 40% by weight.

9. Composite part according to any of the preceding embodiments, wherein the content of the component B.2) based on the sum of the components A), B) and C) is in the range of 10% to 30% by weight.

10. Composite part according to any of the preceding embodiments, wherein the component B) contains as rubber at least one rubber selected from the group consisting of diene rubbers, mixtures of diene rubbers and copolymers of diene rubbers or mixtures thereof with further copolymerizable monomers.

11. Composite part according to any of the preceding embodiments, wherein the carrier contains
50% to 80% by weight of the component A),
19.9% to 49.9% by weight of the component B) and
0.1% to 20% by weight of the component C.

12. Composite part according to any of the preceding embodiments, wherein the carrier contains
55% to 75% by weight of the component A),
24.8% to 44.8% by weight of the component B) and
0.2% to 10% by weight of the component C.

13. Composite part according to any of the preceding embodiments, wherein in a layer which is 5 to 10 µm below the interface of the carrier (i) with the coating (ii) the carrier (i) has a phase structure which is characterized in that the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <7.

14. Composite part according to any of the preceding embodiments, wherein in a layer which is 5 to 10 µm below the interface of the carrier (i) with the coating (ii) the carrier (i) has a phase structure which is characterized in that the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <5.

15. Composite part according to any of the preceding embodiments, wherein the coating is a compact lacquer layer.

16. Composite part according to embodiment 15, wherein the compact lacquer layer has a thickness of not more than 500 µm.

17. Composite part according to any of the preceding embodiments, wherein the component C is selected from the group consisting of flame retardants, anti-drip agents, flame retardant synergists, smoke inhibitors, lubricants and demolding agents, nucleating agents, antistats, conductivity additives, stabilizers, flow promoters, phase compatibilizers, further impact modifiers distinct from component B.1), further polymeric constituents distinct from components A) and B), fillers and reinforcers and dyes and pigments.

18. Composite part according to any of the preceding embodiments, wherein the component C contains a phase compatibilizer.

19. Composite part according to embodiment 18, wherein the phase compatibilizer is a graft or block copolymer containing blocks of polymers of component A and blocks of polymers of component B.2), optionally containing further vinyl monomers having reactive groups selected from anhydride groups and epoxide groups.

20. Composite part according to embodiment 19, wherein the phase compatibilizer contains styrene, acrylonitrile and glycidyl methacrylate.

21. Composite part according to any of the preceding embodiments, wherein the carrier was produced by an injection molding process.

22. Composite part according to any of the preceding embodiments, wherein the carrier consists to an extent of at least 90% by weight of the components A), B) and C).

23. Composite part according to any of the preceding embodiments, wherein the carrier consists to an extent of at least 95% by weight of the components A), B) and C).

24. Composite part according to any of the preceding embodiments, wherein the carrier consists of the components A), B) and C).

25. Process for producing a composite part according to any of the preceding embodiments, wherein in a first process step the carrier is produced by an injection molding process and in a second process step the surface coating is applied.

26. Process for producing a composite part according to any of embodiments 2 to 24, wherein in a first process step the carrier is produced by an injection molding process and in the second process step a polyurethane layer is applied by a 2K RIM direct coating process.

27. Process according to either of embodiments 25 and 26, wherein before the second process step in a layer which is 5 to 10 µm below the interface of the carrier (i) with the coating (ii) the carrier has a phase structure which is characterized in that the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <5.

EXAMPLES

Employed Components in the Carrier Material
Component A:
Linear polycarbonate based on bisphenol A having a weight-average molecular weight Mw of 32 000 g/mol (determined by GPC in methylene chloride against a bisphenol A-polycarbonate standard).
Component B-1:
ABS-type graft polymer precipitated with magnesium sulfate in an acidic medium produced by grafting by the emulsion polymerization process using potassium peroxodisulfate as polymerization initiator of 52 parts by weight of a mixture of styrene and acrylonitrile in a % by weight ratio of 72:28 onto 48 parts by weight of a particulate crosslinked polybutadiene rubber having a particle diameter determined by ultracentrifugation of d50=0.3 µm. The gel content of component B-1 measured as the acetone-insoluble proportion is 78% by weight, i.e. component B-1 contains 22% by weight of vinyl (co)polymer not chemically bonded to the rubber substrate or enclosed in the rubber substrate.

Component B-2:

Styrene-acrylonitrile copolymer having an acrylonitrile content of 24% by weight and a weight-average molecular weight Mw of 102 000 g/mol (determined by GPC against a polystyrene standard).

Component C1:

Modiper™ CL430-G (NOF Corporation, Japan): Phase compatibilizer (graft polymer composed of polycarbonate and a styrene-acrylonitrile-glycidyl methacrylate copolymer)

Component C2:

Irganox™ B900 (BASF, Germany): Stabilizer

Production of the Molding Materials

The mixing of the components was carried out in a Coperion ZSK 26 MCC twin-screw extruder at a melt temperature of 275° C.

Reactive Polyurethane Coating System

Employed as the polyurethane coating system was a mixture of Desmophen™ XP 2488 (polyol component) and Desmodur™ N3600 (polyisocyanate component), both from Covestro, Leverkusen, Germany, in a mixing ratio of 1:1.7 parts by weight.

Desmophen™ XP 2488 is a branched polyester polyol having a viscosity according to DIN 53019 (2008 version) of 13250 mPa·s at 20° C., a density according to DIN 51757 (2011 version) of 1.12 g/cm$^3$ at 20° C. and an OH content of 16.0%.

Desmodur™ N3600 is an aliphatic isocyanate based on hexamethylene diisocyanate having an NCO content according to DIN EN ISO 11909 (2007 version) of 23.5% by weight, a viscosity at 23° C. according to DIN EN ISO 3219/A.3 (1994 version) of 1200 mPa·s and a density at 20° C. according to DIN EN ISO 2811 (2014 version) of 1.16 g/cm$^3$.

The crosslinking of the polyurethane coating system was catalyzed with a dibutyltin dilaurate (DBTL) commercially available from OMG Borchers GmbH, Langenfeld. The addition amount was 0.5 parts by weight based on the sum of the polyol component and the polyisocyanate component.

Production of the Composite Parts

Partially surface coated moldings having an area of 412 cm$^2$ were produced on an injection molding machine in an injection mold having two cavities (a substrate-side cavity and a polyurethane-side coating cavity linked to an RIM system). The composite part is a sheetlike part made of thermoplastic having a composition according to table 1 (carrier), whose surface has been partially coated with a polyurethane layer. The wall thickness of the carrier molding was about 4 mm. The polyurethane layer thickness was about 200 µm.

The inventive process for producing the inventive composite parts described in the examples is shown in FIG. 1 for clarity.

In the first process step the carrier molding was produced. To this end, thermoplastic granulate of the compositions as described in table 1 was melted in an injection molding barrel and injected into the first mold cavity of the closed mold at a temperature of 270° C. (steps 1 and 2 in FIG. 1). This mold cavity was temperature controlled to a temperature of 80° C. After elapsing of the holding time and the cooling time which led to solidification of the carrier, in the second process step the mold was opened (step 3 in FIG. 1). The produced carrier part was held on the ejector side of the injection mold and together with the mold core completely displaced from the carrier position (step 3 in FIG. 1) into the coating position (step 4 in FIG. 1) using a slider. Thereafter, the injection mold was closed again (step 5 in FIG. 1), a closing force for a maximum pressure of 200 bar was applied and in the third process step the solvent-free reactive polyurethane system (see above) was injected into the coating cavity at a pressure of about 30 bar (step 6 in FIG. 1). This was done by conveying the two reactive components of the polyurethane coating system from the RIM system into a high-pressure countercurrent mixing head and mixing them therein prior to injection. The polyurethane-side cavity was temperature controlled to a temperature of 80° C. Once injection was complete the injection nozzle of the polyurethane mixing head was sealed using a hydraulic piston under a pressure initially of 50 bar to prevent backflow of the coating material. After elapsing of the reaction time and the cooling time, in the fourth process step the mold was opened once more (step 7 in FIG. 1) and the coated molding was demolded (step 8 in FIG. 1).

Determination of Adhesion Properties

Composite adhesion was determined on strip samples having a width of 20 mm sawn from the partially polyurethane-coated 2-component composite sheets produced as described above by a roller peel test according to DIN EN 1464 (2010 version) with a test speed of 100 mm/min.

Characterization of the Part Morphology after Roller Peel Test

Samples were prepared from the parts and using an ultramicrotome (Leica EM UC7) low-temperature thin sections having a thickness of about 50 nm of the areas to be examined (surface-proximal, i.e. directly at the surface of the carrier after peeloff of the polyurethane coating in the roller peel test, and surface-distal, i.e. 2 mm below the surface, i.e. in the middle of the volume of the carrier) with a cutting direction parallel to the injection molding direction were produced. These samples were initially contrasted with OsO$_4$ for 30 seconds under vacuum (contrasting of the polybutadiene rubber) and then contrasted for 15 minutes in RuO$_4$ (contrasting of polycarbonate). The thin sections double contrasted in this way were subsequently examined with a Leo 922 A EFTEM transmission electron microscope (TEM) (Carl Zeiss, Germany).

FIG. 2 shows a surface-proximal TEM micrograph of a noninventive composite part (containing a carrier composed of the composition of comparative example 1 in table 1) after the roller peel test, i.e. after peeloff of the polyurethane coating. On the substrate-side surface of the peeled-off lacquer layer there adhered a 0.5-4 µm thick layer of the PC/ABS substrate composition, thus showing that the "delamination" must be attributed to a cohesive fracture failure in the carrier material in a layer 0.5-4 µm below the surface of the carrier surface. Down to a depth of about 10 µm (i.e. in the entire micrograph) the TEM micrograph shows a lamellar phase morphology of highly stretched rubber-modified styrene-acrylonitrile copolymer domains dispersed in a polycarbonate matrix. The aspect ratio (ratio of geometric extent parallel to the melt flow direction during thermoplastic production of the carrier to geometric extent perpendicular to the carrier surface) of all rubber-modified styrene-acrylonitrile copolymer domains is >20. The surface of the composite part after the roller peel test has a comparatively low roughness.

FIG. 3 shows a surface-proximal TEM micrograph of an inventive composite part (containing a carrier composed of the composition of example 2 in table 1) after the roller peel test, i.e. after peeloff of the polyurethane coating. On the substrate-side surface of the peeled-off lacquer layer there adhered a 0.5-4 µm thick layer of the PC/ABS substrate composition, thus showing that the "delamination" must be attributed to a cohesive fracture failure in the carrier material in a layer 0.5-4 μm below the surface of the carrier surface. Down to a depth of about 10 μm (i.e. in the entire micrograph) the TEM micrograph shows a disperse phase morphology of largely isotropic, i.e. unstretched, rubber-modified styrene-acrylonitrile copolymer domains dispersed in a continuous polycarbonate matrix. The aspect ratio (ratio of geometric extent parallel to the melt flow direction during thermoplastic production of the carrier to geometric extent perpendicular to the carrier surface) of the rubber-modified styrene-acrylonitrile copolymer domains is <5 in all cases. The surface of the composite part after the roller peel test has a comparatively high roughness.

Figure 1:
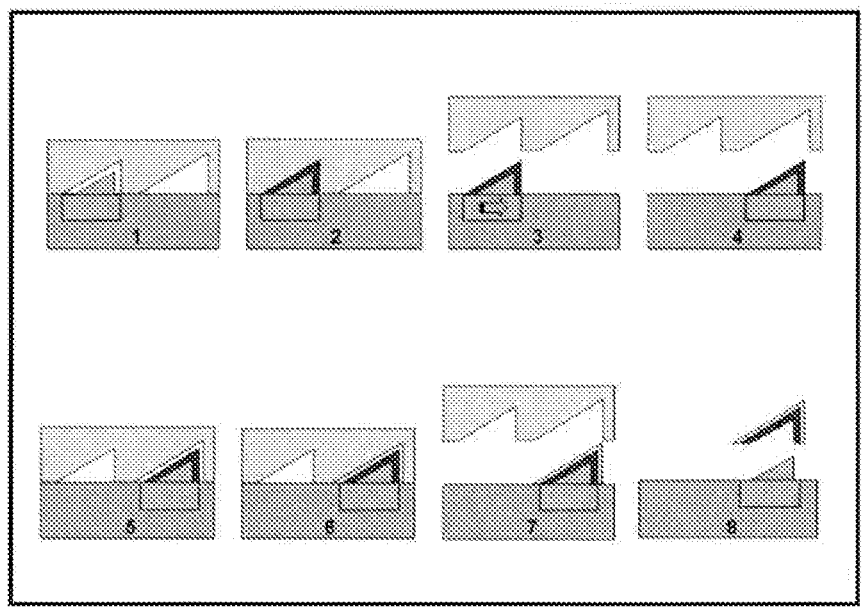
Figure 2:
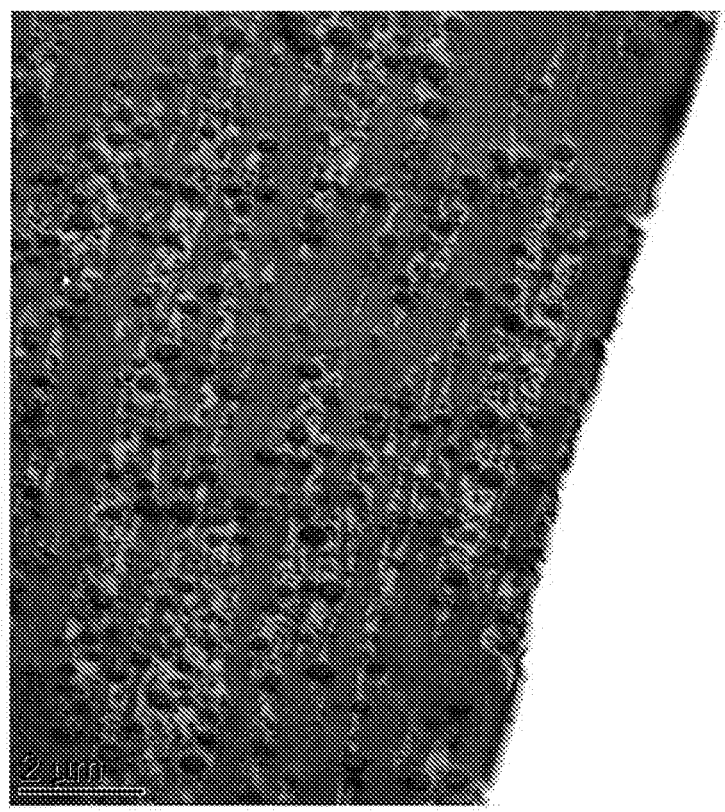
Figure 3:
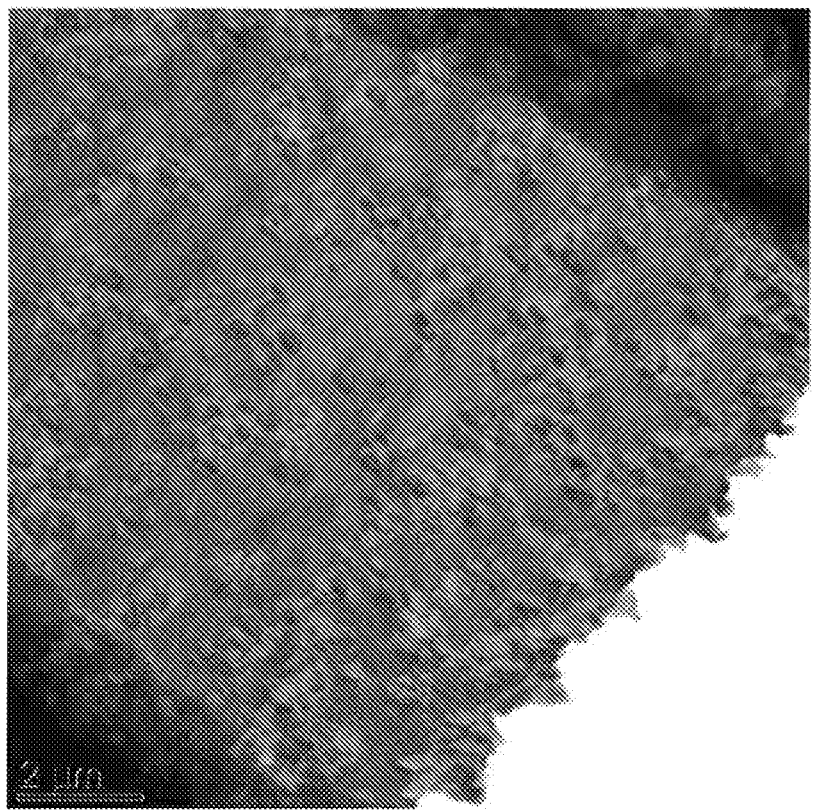
Figure 4:
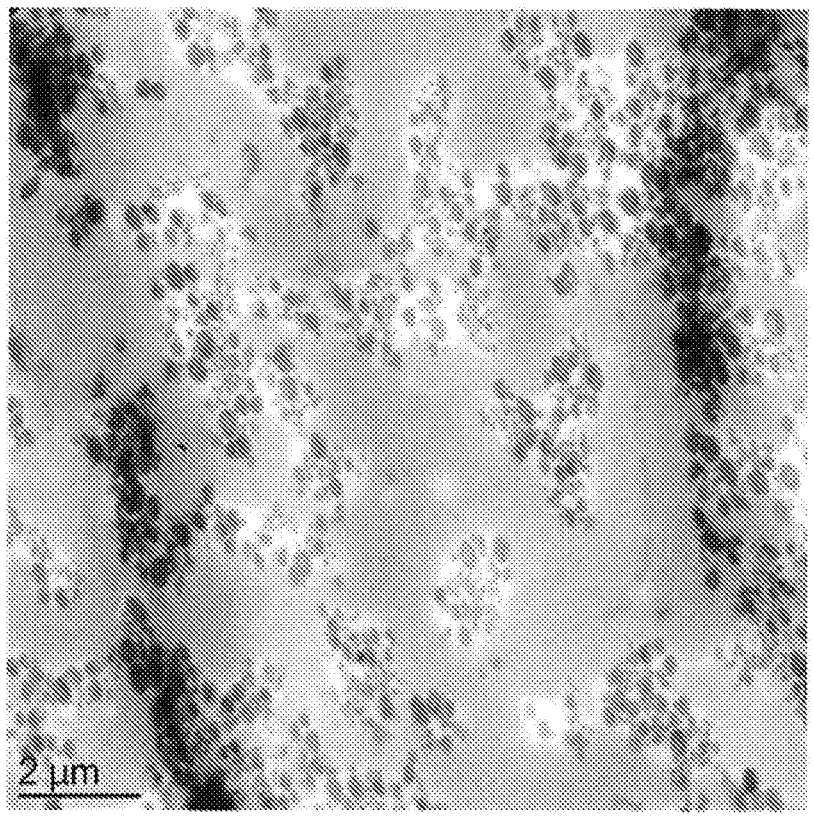
FIG. 4 shows a surface-distal TEM micrograph of a noninventive composite part containing a carrier composed of the composition of comparative example 1 in table 1. The TEM micrograph shows a coarsely disperse phase morphology of largely isotropic, i.e. unstretched, rubber-modified styrene-acrylonitrile copolymer domains dispersed in a continuous polycarbonate matrix.
Figure 5:
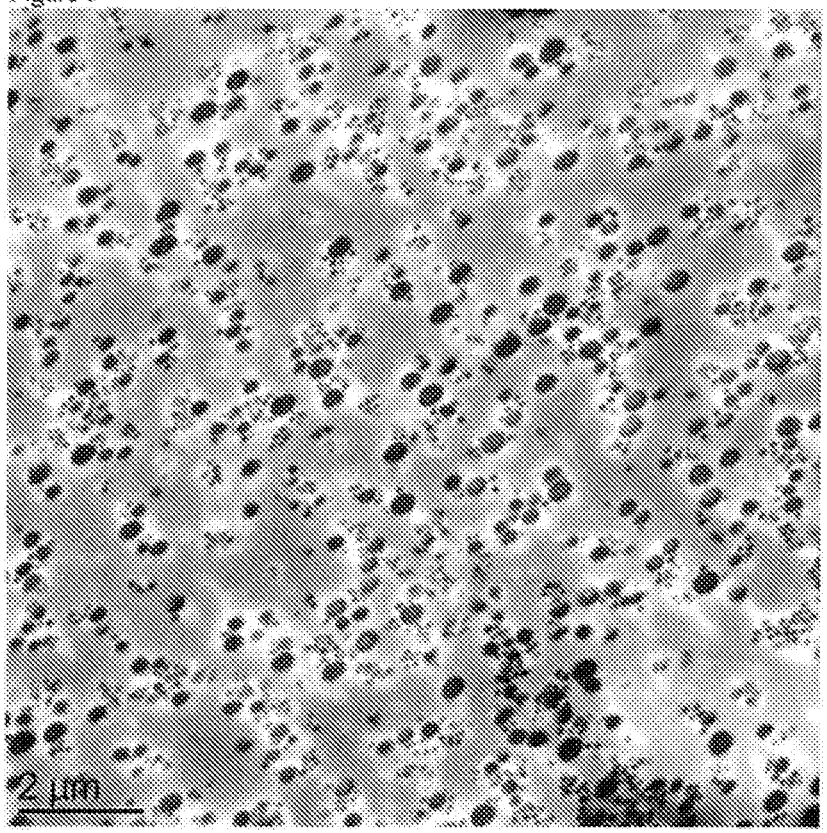
FIG. 5 shows a surface-distal TEM micrograph of an inventive composite part containing a carrier composed of the composition of example 2 in table 1. The TEM micrograph shows a finely disperse phase morphology of largely isotropic, i.e. unstretched, rubber-modified styrene-acrylonitrile copolymer domains dispersed in a continuous polycarbonate matrix.

A comparison of FIGS. 3 (surface-proximal) and 5 (maximally surface-distal since 2 mm distance from the surface for a test specimen of 4 mm in thickness) reveals that in the inventive composite parts the phase morphology is substantially constant over the entire carrier thickness, i.e. the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <5.

TABLE 1

Compositions of the carrier materials and part properties

| Composition (parts by weight) | 1(V) | 2 |
|---|---|---|
| A | 60 | 60 |
| B-1 | 20 | 20 |
| B-2 | 20 | 15 |
| C1 | 0 | 5 |
| C2 | 0.1 | 0.1 |
| Features | | |
| B.1.2) rubber content based on B-1 + B-2 [% by weight] | 24 | 27 |
| B.2) content based on B-1 + B-2 [% by weight] | 61 | 55 |
| ABS morphology | | |
| In the surface (5 to 10 μm below the interface) | lamellar | disperse |
| In the volume | coarsely disperse | disperse |
| Aspect ratios of surface-proximal ABS domains in carrier material after roller peel test | >20 | <5 |
| Properties | | |
| Adhesion in roller peel test [N/mm] | 0.4 | 1.1 |

The data in table 1 show that a markedly improved composite adhesion measured in the roller peel test is achieved when the interface-proximal phase morphology in the carrier of the composite part is such that in a layer 5 to 10 μm below the interface between the coating and the carrier the ABS phase is stretched only slightly, i.e. has a low aspect ratio of geometric extent parallel to the melt flow direction during thermoplastic production of the carrier to geometric extent perpendicular to the carrier surface, and a non-lamellar disperse phase structure is therefore present in this layer.

The invention claimed is:

1. A composite part containing
   (i) a carrier made of a thermoplastic composition containing at least the following constituents
      A) 45% to 90% by weight based on the sum of all constituents of the composition of at least one polymer selected from the group consisting of polycarbonate, polyester, polyester carbonate and polyamide,
      B) 10% to 55% by weight based on the sum of all constituents of the composition of rubber-modified vinyl (co)polymer containing
         B.1) one or more graft polymers of
            B.1.1) 10% to 80% by weight of at least one vinyl monomer on
            B.1.2) 20% to 90% by weight of one or more rubber-like graft substrates,
            wherein the polymer chains formed from the monomers B.1.1) are chemically bonded to the graft substrate B.1.2) or are enclosed in the graft substrate such that during production and processing of the compositions according to the invention they do not escape from this graft substrate and
         B.2) one or more rubber-free (co)polymers of at least one vinyl monomer and
      C) 0% to 30% by weight based on the sum of all constituents of the composition of one or more polymer additives,
         wherein the rubber content B.1.2) based on the component B) is 10% to 40% by weight
         and wherein the component B) contains at least 20% by weight of vinyl (co)polymer B.2) not chemically bonded to the graft substrate or enclosed in this graft substrate
   and
   (ii) at least one single- or multi-ply coating in direct contact with this carrier selected from at least one representative of the group consisting of polymer coating and metal coating
   wherein in a layer which is 5 to 10 μm below the interface of the carrier (i) with the coating (ii) the carrier (i) has a phase structure which is characterized in that the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <10.

2. The composite part as claimed in claim 1, wherein the coating is a polyurethane coating.

3. The composite part as claimed in claim 1, wherein the component A) is aromatic polycarbonate.

4. The composite part as claimed in claim 1, wherein the content of the component B.2) based on the sum of the components A), B) and C) is in the range of 10% to 30% by weight.

5. The composite part as claimed in claim 1, wherein the carrier contains

55% to 75% by weight of the component A),
24.8% to 44.8% by weight of the component B) and
0.2% to 10% by weight of the component C.

6. The composite part as claimed in claim 1, wherein the coating is a compact lacquer layer.

7. The composite part as claimed in claim 6, wherein the compact lacquer layer has a thickness of not more than 500 μm.

8. The composite part as claimed in claim 1, wherein the component C is selected from the group consisting of flame retardants, anti-drip agents, flame retardant synergists, smoke inhibitors, lubricants and demolding agents, nucleating agents, antistats, conductivity additives, stabilizers, flow promoters, phase compatibilizers, further impact modifiers distinct from component B.1), further polymeric constituents distinct from components A) and B), fillers and reinforcers and dyes and pigments.

9. The composite part as claimed in claim 1, wherein component C is included in an amount of 0.1% to 30% by weight and wherein the component C contains a phase compatibilizer.

10. The composite part as claimed in claim 9, wherein the phase compatibilizer is a graft or block copolymer containing blocks of polymers of component A and blocks of polymers of component B.2), optionally containing further vinyl monomers having reactive groups selected from anhydride groups and epoxide groups.

11. The composite part as claimed in claim 9, wherein the phase compatibilizer is a graft or block copolymer containing blocks of polymers of component A and blocks of a styrene-acrylonitrile-glycidyl methacrylate copolymer and wherein the carrier is produced by an injection molding process and wherein the coating is a polyurethane coating.

12. The composite part as claimed in claim 1, wherein the carrier consists of the components A), B) and C).

13. A process for producing a composite part as claimed in claim 1, wherein in a first process step the carrier is produced by an injection molding process and in a second process step the surface coating is applied.

14. The process for producing a composite part as claimed in claim 2, wherein in a first process step the carrier is produced by an injection molding process and in the second process step a polyurethane layer is applied by a 2K RIM direct coating process.

15. The process as claimed in claim 13, wherein before the second process step in a layer which is 5 to 10 μm below the interface of the carrier (i) with the coating (ii) the carrier has a phase structure which is characterized in that the rubber-modified vinyl (co)polymer of component B) is present in the component A) dispersed in phases having a respective ratio of geometric extent parallel to the melt flow direction during thermoplastic production of the carrier to geometric extent perpendicular to the carrier surface determined by transmission electron microscopy after OsO4/RuO4 double contrasting of <5.

16. The composite part claimed in claim 1, wherein the phases are obtained by using a phase compatibilizer as a constituent of component C and/or by heat treating of the carrier before coating and/or by swelling of the carrier surface in a solvent before coating.

17. A process for producing a composite part as claimed in claim 1, wherein in a first process step the carrier is produced by an injection molding process and in a subsequent process step the surface coating is applied, wherein a phase compatibilizer as a constituent of component C is used and/or the carrier is heat-treated before coating and/or the carrier surface is swollen in a solvent before coating.

* * * * *